(12) United States Patent
Shin et al.

(10) Patent No.: US 10,310,343 B2
(45) Date of Patent: Jun. 4, 2019

(54) DISPLAY PANEL

(71) Applicant: LG DISPLAY CO., LTD., Seoul (KR)

(72) Inventors: Hoon-Sub Shin, Chilgok-gun (KR);
Mi-Kyung Lee, Chilgok-gun (KR);
Ji-Yun Jang, Chilgok-gun (KR);
Jun-Sung Kong, Busan (KR);
Yong-Hee Han, Jeonju-si (KR);
Eun-Young Yun, Yangsan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/826,086

(22) Filed: Nov. 29, 2017

(65) Prior Publication Data

US 2018/0149936 A1 May 31, 2018

(30) Foreign Application Priority Data

Nov. 30, 2016 (KR) .................. 10-2016-0162177

(51) Int. Cl.
*G02F 1/1335* (2006.01)
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/133512* (2013.01); *G02F 1/133524* (2013.01); *G02F 2001/136222* (2013.01)

(58) Field of Classification Search
CPC ........... G02F 1/13394; G02F 1/133512; G02F 2001/13396; G02F 1/133514
See application file for complete search history.

(56) References Cited

U.S. PATENT DOCUMENTS

| | | | |
|---|---|---|---|
| 2005/0146669 A1* | 7/2005 | Yeh ...................... | G02F 1/13394 349/141 |
| 2009/0015780 A1* | 1/2009 | Choi ................... | G02F 1/13394 349/156 |

* cited by examiner

*Primary Examiner* — Thanh Nhan P Nguyen
(74) *Attorney, Agent, or Firm* — Birch, Stewart, Kolasch & Birch, LLP

(57) ABSTRACT

Disclosed is a display panel in which a black matrix is formed on an upper substrate, which is disposed so as to face a lower substrate, so as to delimit each pixel area, a plurality of light control partitions is provided in the pixel area of the upper substrate, a color filter is provided in the pixel area of the upper substrate, and an overcoat layer is provided over the entire surface of the upper substrate. The light control partitions are formed in the pixel area simultaneously with the formation of the black matrix, which enables the omission of an existing light control film. Thereby, a narrow viewing angle is realized without increasing the thickness or manufacturing cost of a product.

16 Claims, 13 Drawing Sheets

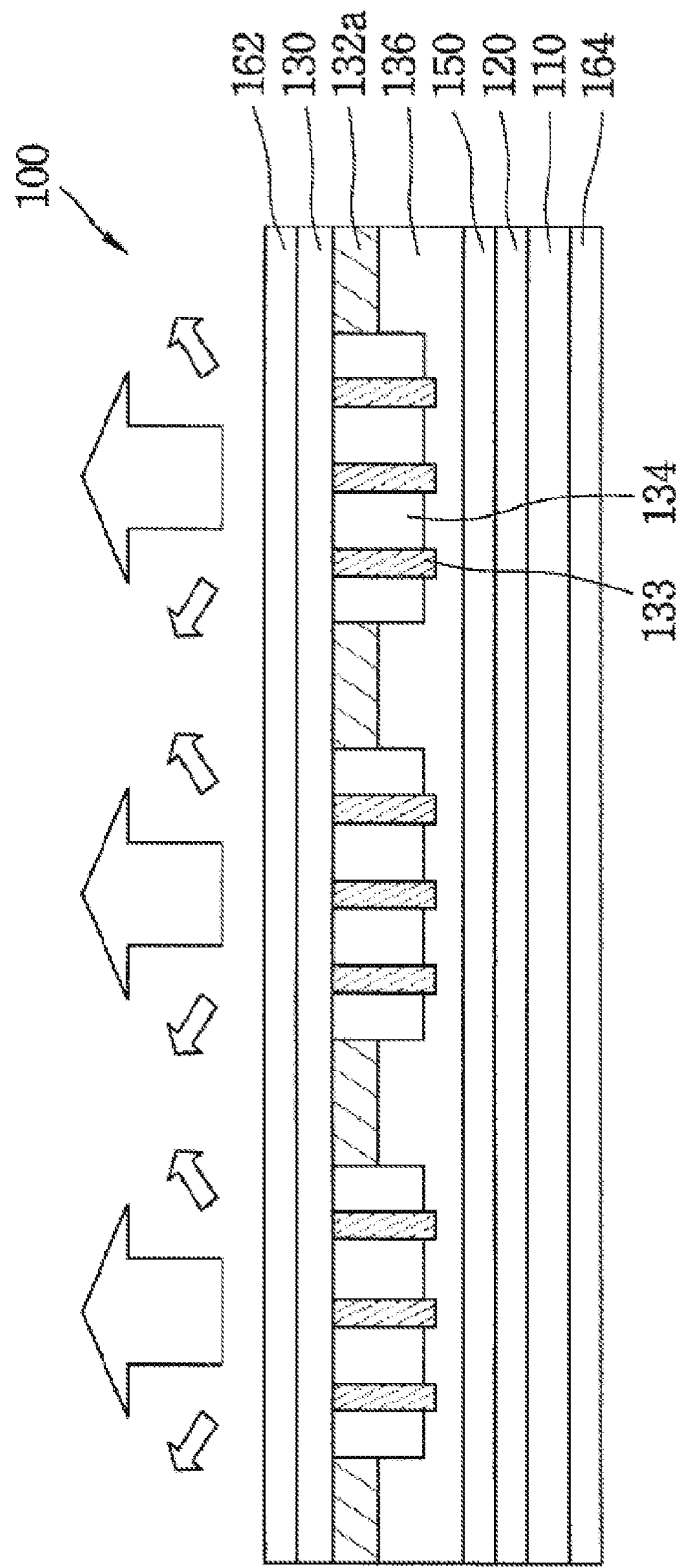

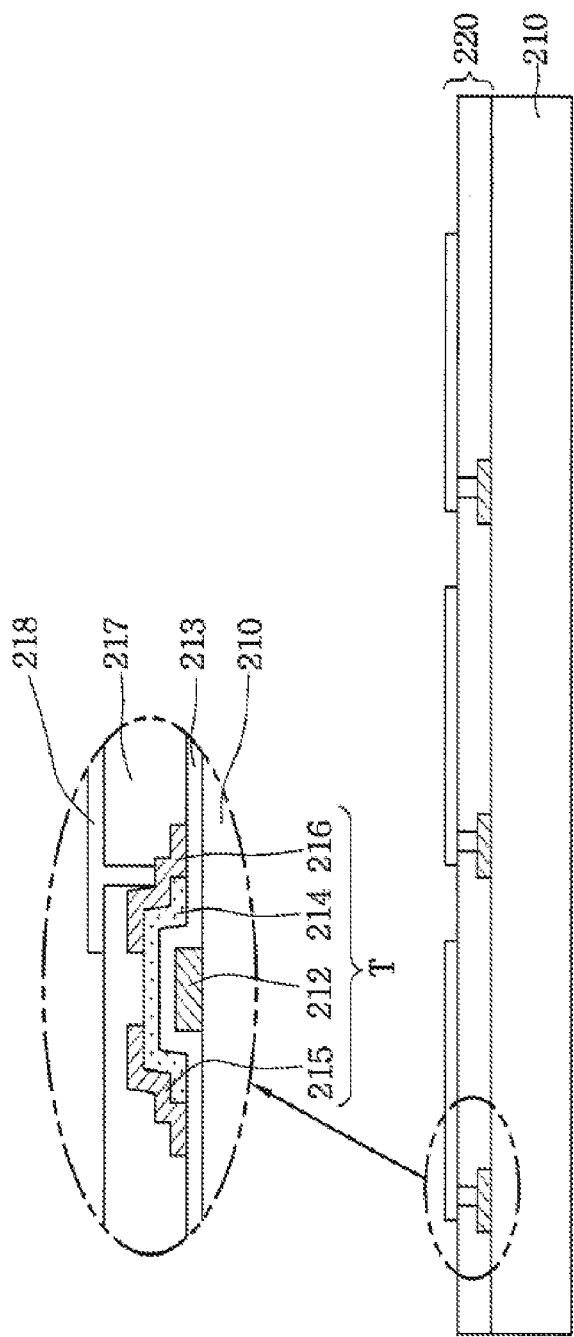

DISPLAY PANEL

CROSS-REFERENCE TO RELATED APPLICATION

This application claims the priority benefit of Korean Patent Application No. 10-2016-0162177, filed on Nov. 30, 2016 in the Republic of Korea, which is hereby incorporated by reference as if fully set forth herein.

BACKGROUND OF THE INVENTION

Field of the Invention

The present invention relates to a display panel, and more particularly, to a display panel, which enables the realization of a viewing angle such that it may be viewed only by a user without increasing the thickness of the display panel or the cost thereof.

Discussion of the Related Art

Among display devices, a liquid crystal display device converts a particular molecular arrangement of liquid crystals into another molecular arrangement by applying a voltage thereto, and converts variation in optical properties of liquid crystal cells that emit light, such as, for example, birefringence, rotatory polarization, and light scattering into variation in the angle of view using such molecular arrangement. As a display device using the modulation of light by liquid crystal cells, a general liquid crystal display device displays an image corresponding to video signals by adjusting the transmittance of light of liquid crystal cells in a liquid crystal panel.

Although such a liquid crystal display device basically displays red, green and blue colors R, G and B using a plurality of liquid crystal pixels and color filters, in recent years, exemplary configurations in which separate pixels for the display of white color are added, for example, in order to increase brightness or to control a viewing angle are increasing.

FIG. 1 is a view schematically illustrating a general liquid crystal display panel.

Referring to FIG. 1, the liquid crystal display panel includes a lower polarized plate 54, a lower substrate 10, an upper substrate 30 disposed above the lower substrate 10 and spaced apart from the lower substrate 10 by a constant distance, a liquid crystal layer 400 formed between the lower substrate 10 and the upper substrate 30, an upper polarized plate 52, and a light control film 60 disposed above the upper substrate 30 to control light.

A thin-film transistor array 20 including thin-film transistors TFT is formed on the lower substrate 10, and red, green and blue color filters 34 are formed on the upper substrate 30. A black matrix (BM) 32 is formed on the boundary between the color filters 34.

In addition, an overcoat layer 36 is formed over the black matrix 32 and the color filters 34.

Moreover, the light control film 60 includes therein a plurality of partitions (not illustrated), which are spaced apart from each other by a predetermined distance.

Accordingly, in the liquid crystal display panel 1, an image is formed on the entire surface of the liquid crystal display panel 1 by light provided from a light source unit, i.e., a backlight unit (not illustrated) below the liquid crystal display panel 1. The formed image appears outside through the light control film 60.

At this time, the formed image is viewed to the front side of the liquid crystal display panel 1 by the partitions (not illustrated) in the light control film 60, whereas light discharged at a side viewing angle is blocked by the light control film 60 so as to be visible only to a user.

However, although the general liquid crystal display panel realizes a narrow viewing angle using the light control film, the addition of the light control film is required, which causes an increase in the cost and thickness of products.

In particular, in the case where a display having no light control film described above is used in a vehicle, a screen that is visible only to the user is not realized, and, for example, a phenomenon in which the screen is reflected on the windshield of the vehicle, may occur. Thus, the clear view of the vehicle driver is not secured, thereby making smooth operation impossible.

SUMMARY OF THE INVENTION

Accordingly, the present invention is directed to a display panel that substantially obviates one or more problems due to limitations and disadvantages of the related art.

An object of the present invention is to provide a display panel in which a plurality of light control partitions is formed in a pixel area when a black matrix is formed, which enables the omission of an existing light control film, thereby realizing a viewing angle mode that is visible only to a user without increasing the thickness or manufacturing costs of products.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display panel includes a lower substrate having a thin-film transistor array, an upper substrate disposed so as to face the lower substrate, a black matrix provided on the upper substrate and configured to delimit each pixel area, a light control partition provided in the pixel area of the upper substrate, a color filter provided in the pixel area of the upper substrate, an overcoat layer provided over an entire surface of the upper substrate on which the color filter and the light control partition have been provided, and a liquid crystal layer provided between the upper substrate and the lower substrate.

The light control partition may be formed of the same material as the black matrix, or may be formed of a material different from a material of the black matrix.

In addition, the light control partition may have the same thickness as the black matrix, or may have a thickness different from a thickness of the black matrix.

The light control partition may have a width smaller than a width of the black matrix.

In addition, the light control partition may include one or more light control partitions.

The light control partitions may have therebetween a distance smaller than a cell gap.

The light control partition may have a width smaller than a cell gap.

The light control partition may have a thickness greater than a thickness of the black matrix.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a cross-sectional view taken along line III-III of FIG. 2, schematically illustrating one pixel of the display panel;

FIGS. 5A to 5H are process cross-sectional views schematically illustrating a method of manufacturing the display panel according to another embodiment of the present invention.

DETAILED DESCRIPTION OF THE INVENTION

Figure 1:
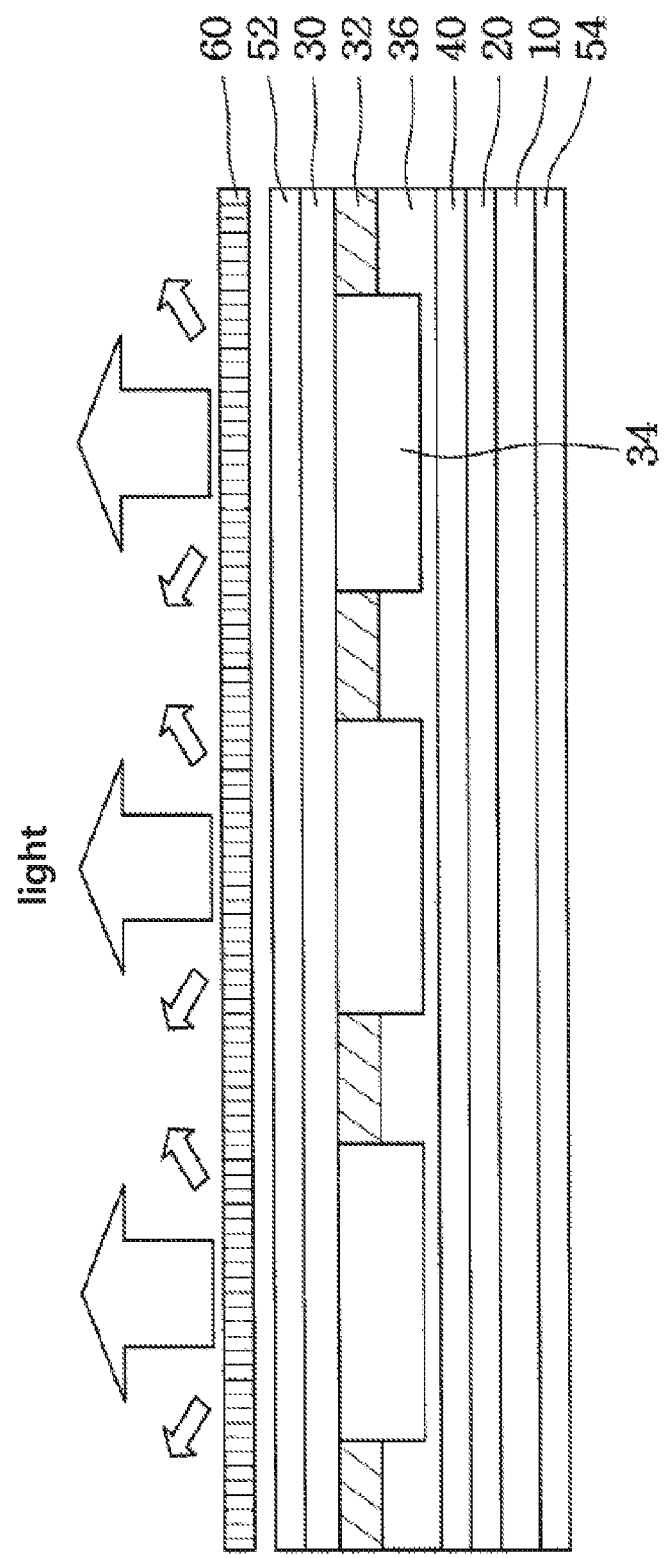
FIG. 1 is a view schematically illustrating a general liquid crystal display panel.

Hereinafter, exemplary embodiments of a display panel according to the present invention will be described in detail with reference to the accompanying drawings, so as to allow those skilled in the art to easily implement the exemplary embodiments.

It is should be noted that, although a liquid crystal display panel will be described by way of example in the present invention, the present invention is not limited thereto and may be applied to emission-type display devices such as, for example, electroluminescent (EL), light-emitting diode (LED), vacuum fluorescent display (VFD), field emission display (FED), and plasma display panel (PDP) display devices as well as non-emission-type display devices.

In addition, the advantages and features of the present invention and the way of attaining them will become apparent with reference to embodiments described below in detail in conjunction with the accompanying drawings. The present invention, however, are not limited to the embodiments disclosed hereinafter and may be embodied in many different forms. Rather, these exemplary embodiments are provided so that this disclosure will be through and complete and will fully convey the scope to those skilled in the art. The scope of the present invention should be defined by the claims. In the drawings, the same or similar elements are denoted by the same reference numerals even though they are depicted in different drawings.

Figure 2:
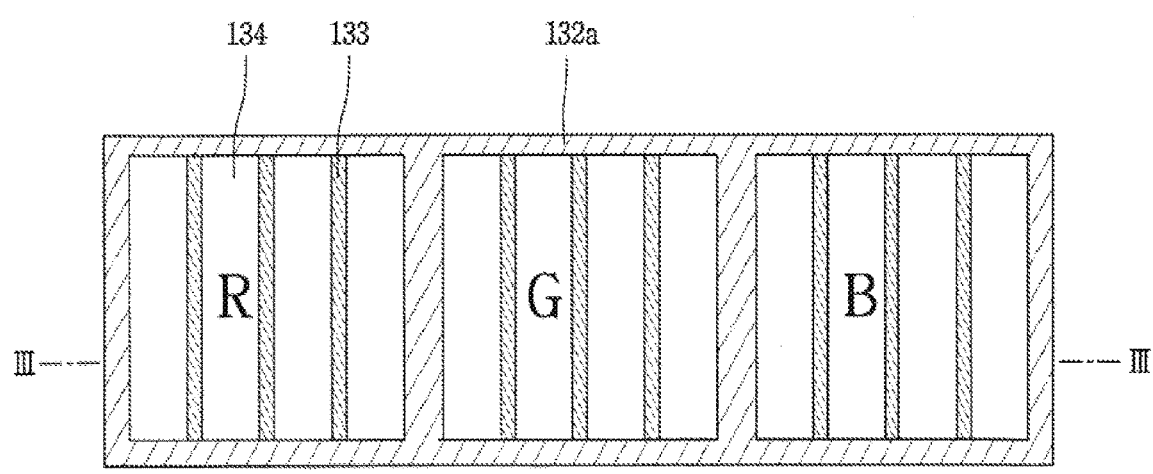
FIG. 2 is a partial plan view illustrating only a portion of a display panel for explaining the structural features of the display panel according to an embodiment of the present invention.

FIG. 2 is a partial plan view illustrating only a portion of a display panel for explaining the structural features of the display panel according to an embodiment of the present invention.

Referring to FIG. 2, in the display panel according to the present invention, red, green and blue display pixels are arranged in a 1×3 matrix form to configure a basic pixel. Here, a plurality of light control partitions 133 is formed in the area in which the red, green and blue display pixels are configured.

However, the display panel according to the present invention is not limited to the configuration in which the red, green and blue display pixels are arranged in a 1×3 matrix form to configure a basic pixel, and the red, green and blue display pixels may be arranged in various forms to configure a basic pixel as needed.

FIG. 3 is a cross-sectional view taken along line III-III of FIG. 2, schematically illustrating one pixel of the display panel.

The display panel 100 according to the present invention includes a lower substrate 110, an upper substrate 130 disposed above the lower substrate 110, and a liquid crystal layer 150 formed to fill the space between the lower substrate 110 and the upper substrate 130.

The lower substrate 110 is formed of a transparent material such as glass. Data lines and gate lines, which are insulated from each other, are formed on the lower substrate 110 so as to cross each other in order to define a plurality of pixel areas. A thin-film transistor array 120 is configured to form a thin-film transistor for each pixel area, which is defined by the data lines and the gate lines.

In addition, a black matrix 132a is formed on the upper substrate 130, which is spaced apart from the lower substrate 110 and disposed to face the lower substrate 110, in the area that corresponds to the boundary between the pixel areas.

In addition, light control partitions 133, which are spaced apart from one another by a constant distance, are formed in each pixel area of the upper substrate 130 inside the black matrix 132a. Here, one or more light control partitions 133 may be provided. In addition, the light control partitions 133 may have a rectangular, trapezoidal, triangular, or any other cross-sectional shape. The light control partitions 133 are configured with the same material layer as the black matrix 132a.

In addition, red, green and blue color filters 134 are formed in the pixel areas of the upper substrate 130. Here, in the pixel areas, in addition to the red, green and blue color filters 134, the light control partitions 133 are formed. The thickness of the light control partitions 133 is greater than the thickness of the color filters 134 and the thickness of the black matrix 132a. However, the light control partitions 133 are not limited to the thickness that is greater than the thickness of the color filters 134 and the thickness of the black matrix 132a, and may have the same thickness as the thickness of the color filters 134 and the thickness of the black matrix 132a as needed.

In addition, an overcoat layer 136 is formed over the entire surface of the upper substrate 130 on which the color filters 134 and the light control partitions 133 have been formed.

In addition, an upper polarizer plate 162 and a lower polarizer plate 164 are formed on the rear surfaces of the upper substrate 130 and the lower substrate 130.

Thus, light, which has been emitted from a backlight unit and moved through the lower substrate 110 and the liquid crystal layer 150, passes through the color filters 134 of the upper substrate 130. At this time, because the light is blocked by the light control partitions 133 at a side viewing angle of the upper substrate 130, the light that has passed through the red, green and blue color filters 134 is not perceived.

However, because the light that has passed through the red, green and blue color filters 134 at a front viewing angle of the upper substrate 130 is perceived by a user, the display panel 100 realizes a viewing angle mode that is visible only to the user.

FIGS. 4A to 4G are process cross-sectional views schematically illustrating a method of manufacturing the display panel according to an embodiment of the present invention.

Figure 4A:
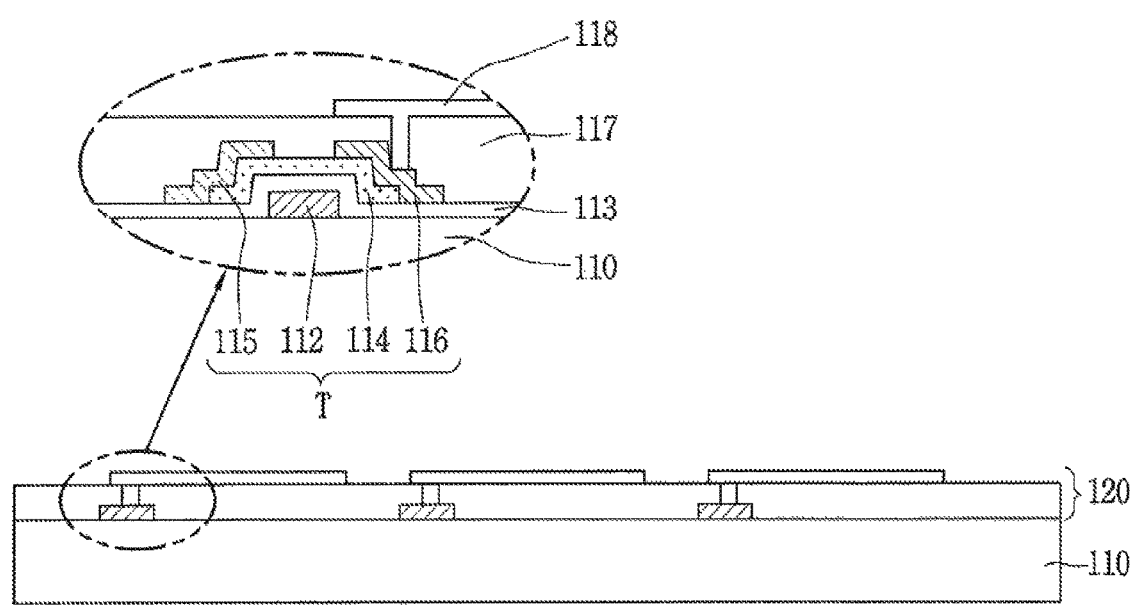
FIGS. 4A to 4G are process cross-sectional views schematically illustrating a method of manufacturing the display panel according to an embodiment of the present invention.

As illustrated in FIG. 4A, the thin-film transistor array 120 is formed on the lower substrate 110, which is formed of a transparent insulating material such as glass.

Explaining processes of forming the thin-film transistor array 120 in detail, after a first metal material is deposited on the lower substrate 110, the first metal pattern is patterned to form a gate line and a gate electrode 112 extending from the gate line. The first metal material may be aluminum (Al), chrome (Cr), molybdenum (Mo), or tungsten (W).

Subsequently, a gate insulation layer 113 is deposited over the entire surface of the lower substrate 110 on which the gate electrode 112 and the gate line have been formed. Here, the gate insulation layer 113 may be formed using an inorganic insulating material such as, for example, silicon nitride (SiNx) or silicon oxide ($SiO_2$).

Subsequently, pure amorphous silicon is deposited on the gate insulation layer 113 and is then patterned to form an active layer 114. At this time, although not illustrated in FIG. 4A, the active layer 114 is formed as a stack structure of amorphous silicon and doped amorphous silicon.

Subsequently, after a second metal material is deposited on the active layer 114, the second metal material is patterned to form a source electrode 115 and a drain electrode 116, which are spaced apart from each other. At this time, the second metal material may be aluminum (Al), chrome (Cr), molybdenum (Mo), or tungsten (W).

In this way, the gate electrode 112, the active layer 114, the source electrode 115, and the drain electrode 116 constitute a thin-film transistor T.

Subsequently, an interlayer insulation layer 117 is formed over the entire surface of the lower substrate 110 on which the source electrode 115 and the drain electrode 116 have been formed.

Subsequently, the interlayer insulation layer 117 is patterned to form a drain contact hole, which exposes a portion of the drain electrode 116.

Subsequently, a pixel electrode 118 is formed on the interlayer insulation layer 117 so as to be electrically connected to the drain electrode 116 through the contact hole. At this time, the pixel electrode 118 may be formed using a transparent conductive material such as, for example, ITO or IZO.

Subsequently, a lower alignment layer is formed over the entire surface of the lower substrate 110 on which the pixel electrode 118 has been formed.

Figure 4B:
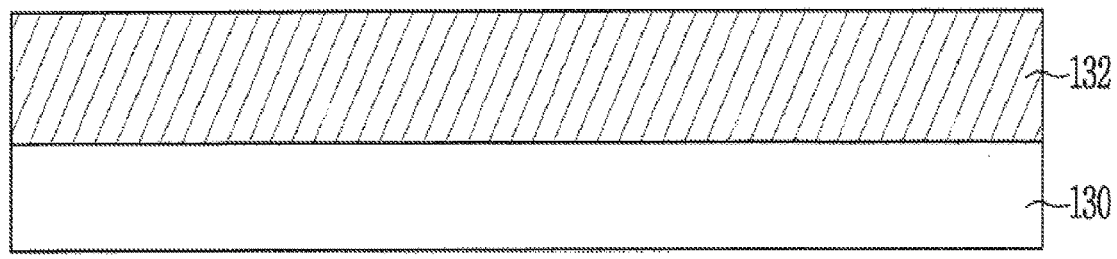

Subsequently, as illustrated in FIG. 4B, a black matrix layer 132, which has negative photosensitivity, is formed on the upper substrate 130, which is formed of a transparent insulating material such as glass. At this time, the black matrix layer 132 may be formed of a black resin having negative photosensitivity, or any other opaque organic material. Alternatively, instead of the black resin having negative photosensitivity, the black matrix layer 132 may be formed of a material having positive photosensitivity.

Figure 4C:
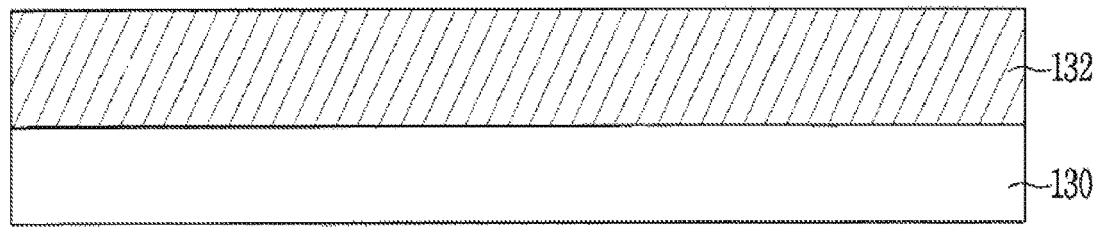

Subsequently, as illustrated in FIG. 4C, a half-ton mask 140 is disposed on the black matrix layer 132. At this time, the half-ton mask 140 includes a semi-transmitting portion 142, which transmits only some light, a transmitting portion 144, which transmits all light, and a light-blocking portion 146, which blocks all light.

The semi-transmitting portion 142 corresponds to a portion of the black matrix layer 132 that forms a black matrix, and the transmitting portion 144 corresponds to a portion of the black matrix layer 132 that forms the light control partition 133 of the black matrix layer 132.

Figure 4D:
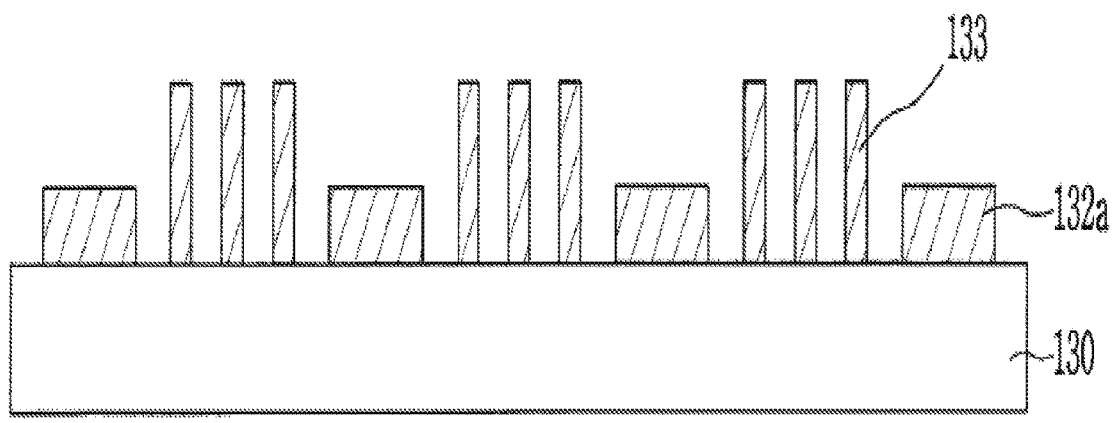

Subsequently, as illustrated in FIG. 4D, after irradiating the black matrix layer 132 with light using the half-ton mask 140 as a mask, a portion of the black matrix layer 132, which is not irradiated with light, is selectively removed through exposure and developing processes, whereby the black matrix 132a and the light control partition 133 are formed.

At this time, the black matrix 132a is formed in the area that correspond to the boundary between a plurality of pixel areas, and the light control partition 133 is formed in each of the pixel areas. In addition, one or more light control partitions 133 may be formed according to resolution or a viewing angle. In addition, the light control partitions 133 may have a rectangular, trapezoidal, triangular or any other cross-sectional shape. In addition, the light control partitions 133 are not limited to being configured with the same material layer as the black matrix 132a, and may be formed of a material different from that of the black matrix 132a.

In addition, the light control partition 133 may have a thickness greater than the thickness of the black matrix 132a. However, the light control partition 133 is not limited to the thickness that is greater than the thickness of the black matrix 132a, and may be formed to have the same thickness as the black matrix 132a.

Figure 4E:
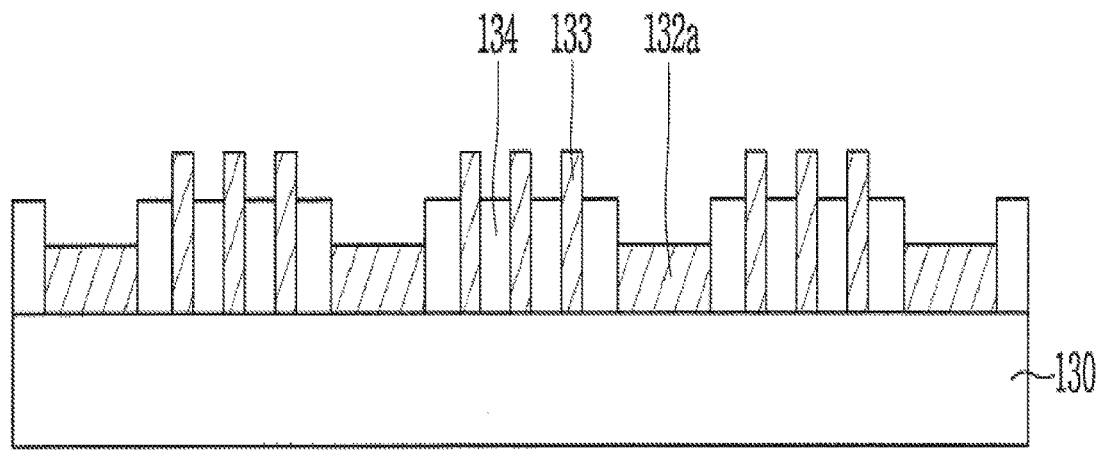

Subsequently, as illustrated in FIG. 4E, red, green and blue color filters 134 are formed in the pixel areas of the upper substrate 130. At this time, in the pixel areas of the upper substrate 130, in addition to the red, green and blue color filters 134, the light control partitions 133 are located.

Figure 4F:
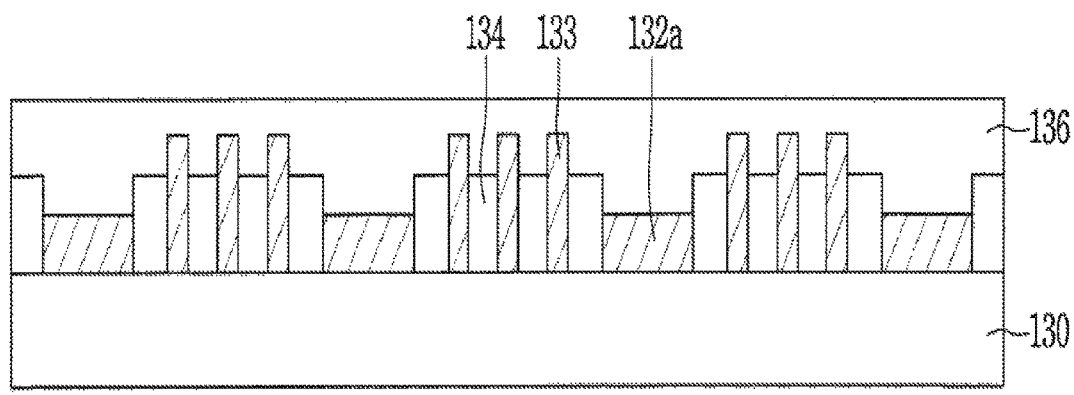
Figure 4G:
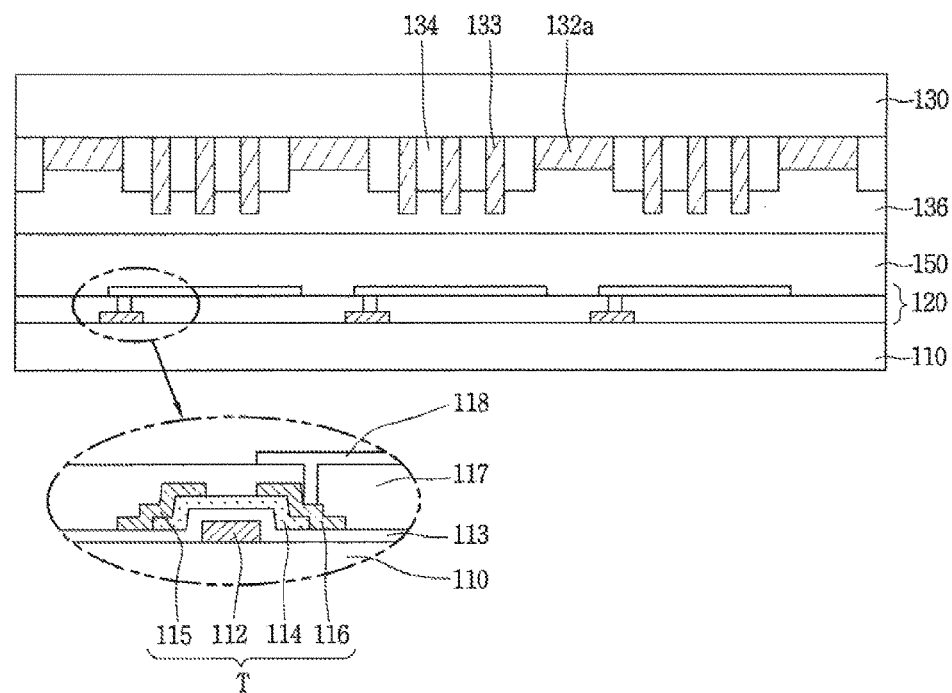

Subsequently, as illustrated in FIG. 4F, the overcoat layer 136 is formed over the entire surface of the upper substrate 130 on which the color filters 134 and the light control partitions 133 have been formed.

Subsequently, an upper alignment layer is formed over the entire surface of the overcoat layer 136.

Subsequently, after the upper substrate 130 and the lower substrate 110 are disposed so as to face each other with a constant distance therebetween, the liquid crystal layer 150 is formed between the substrates 110 and 130.

Subsequently, when the upper polarizer plate 162 and the lower polarizer plate 164 are formed on the rear surfaces of the upper substrate 130 and the lower substrate 110, the process of manufacturing the display panel 100 is completed.

In this way, through the method of manufacturing the display panel according to the embodiment of the present invention, because the black matrix 132a, which separates the respective pixel areas from each other, and the light control partitions 133 may be formed at the same time using one half-ton mask, the number of masking processes and consequently manufacturing costs may be reduced, and the thickness of a product may be reduced owing to the omission of an existing light control film.

FIGS. 5A to 5H are process cross-sectional views schematically illustrating a method of manufacturing a display panel according to another embodiment of the present invention.

As illustrated in FIG. 5A, a thin-film transistor array 220 is formed on a lower substrate 210, which is formed of a transparent insulating material such as glass.

Explaining processes of forming the thin-film transistor array 220 in detail, after a first metal material is deposited on the lower substrate 210, the first metal pattern is patterned to form a gate line and a gate electrode 212 extending from the gate line.

The first metal material may be aluminum (Al), chrome (Cr), molybdenum (Mo), or tungsten (W).

Subsequently, a gate insulation layer 213 is deposited over the entire surface of the lower substrate 210 on which the gate electrode 212 and the gate line have been formed. Here, the gate insulation layer 213 may be formed using an inorganic insulating material such as, for example, silicon nitride (SiNx) or silicon oxide ($SiO_2$).

Subsequently, pure amorphous silicon is deposited on the gate insulation layer 213 and is then patterned to form an active layer 214. At this time, the active layer 214 is formed as a stack structure of amorphous silicon and doped amorphous silicon.

Subsequently, after a second metal material is deposited on the active layer 214, the second metal material is patterned to form a source electrode 215 and a drain electrode 216, which are spaced apart from each other. At this time, the second metal material may be aluminum (Al), chrome (Cr), molybdenum (Mo), or tungsten (W).

In this way, the gate electrode 212, the active layer 214, the source electrode 215, and the drain electrode 216 constitute a thin-film transistor T.

Subsequently, an interlayer insulation layer 217 is formed over the entire surface of the lower substrate 210 on which the source electrode 215 and the drain electrode 216 have been formed.

Subsequently, the interlayer insulation layer 217 is patterned to form a drain contact hole, which exposes a portion of the drain electrode 216.

Subsequently, a pixel electrode 218 is formed on the interlayer insulation layer 217 so as to be electrically connected to the drain electrode 216 through the drain contact hole. At this time, the pixel electrode 218 may be formed using a transparent conductive material such as, for example, ITO or IZO.

Subsequently, a lower alignment layer is formed over the entire surface of the lower substrate 210 on which the pixel electrode 218 has been formed.

Figure 5B:

Subsequently, as illustrated in FIG. 5B, a black matrix layer 232, which has negative photosensitivity, is formed on an upper substrate 230, which is formed of a transparent insulating material such as glass. At this time, the black matrix layer 232 may be formed of a black resin having negative photosensitivity, or any other opaque organic material. Alternatively, instead of the black resin having negative photosensitivity, the black matrix layer 232 may be formed of a material having positive photosensitivity.

Figure 5C:
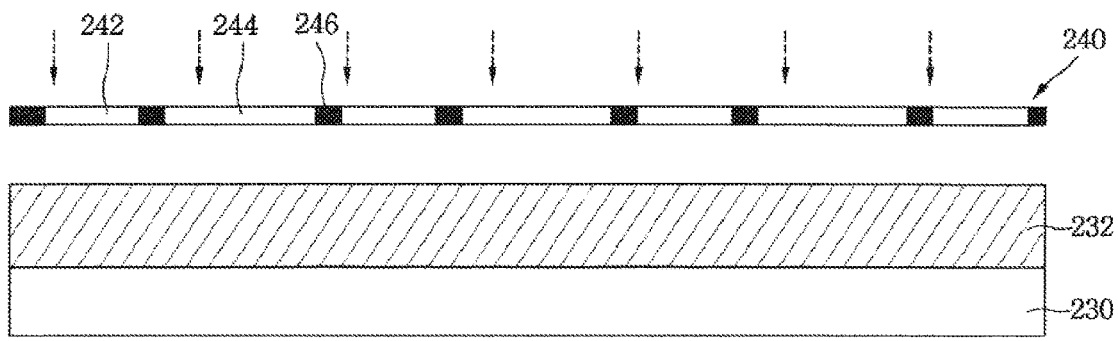

Subsequently, as illustrated in FIG. 5C, a first photo mask 240 is disposed on the black matrix layer 232. At this time, the first photo mask 240 includes first and second transmitting portions 242 and 244, and a light-blocking portion 246. The first transmitting portion 242 corresponds to a portion of the black matrix layer 232 that forms a black matrix, and the second transmitting portion 244 corresponds to a portion of the black matrix layer 232 that forms a light control partition 233 of the black matrix layer 232.

Figure 5D:
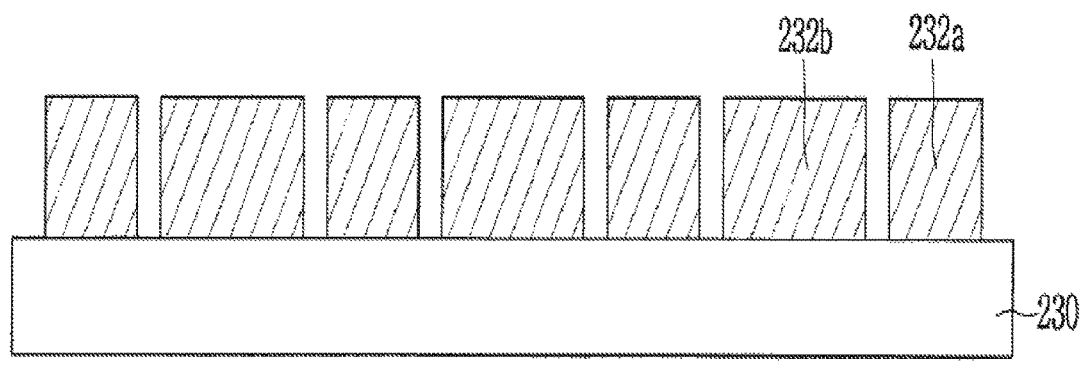

Subsequently, as illustrated in FIG. 5D, after irradiating the black matrix layer 232 with light using the first photo mask 240 as a mask, a portion of the black matrix layer 232, which is not irradiated with light, is removed through exposure and developing processes, whereby a black matrix 232a and a dummy black matrix 232b are formed.

Figure 5E:
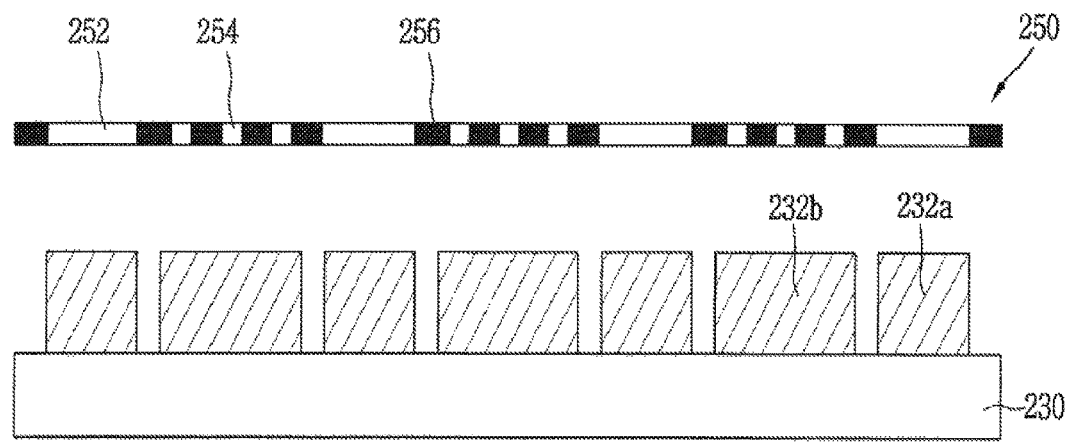

Subsequently, as illustrated in FIG. 5E, a second photo mask 250 is disposed so as to face the upper surface of the upper substrate 230 on which the black matrix 232a and the dummy black matrix 232b have been formed. At this time, the second photo mask 250 includes first and second transmitting portions 252 and 254 and a light-blocking portion 256. The first transmitting portion 252 corresponds to the black matrix 232a, and the second transmitting portion 254 corresponds to the dummy black matrix 232b that forms the light control partition 233.

Figure 5F:
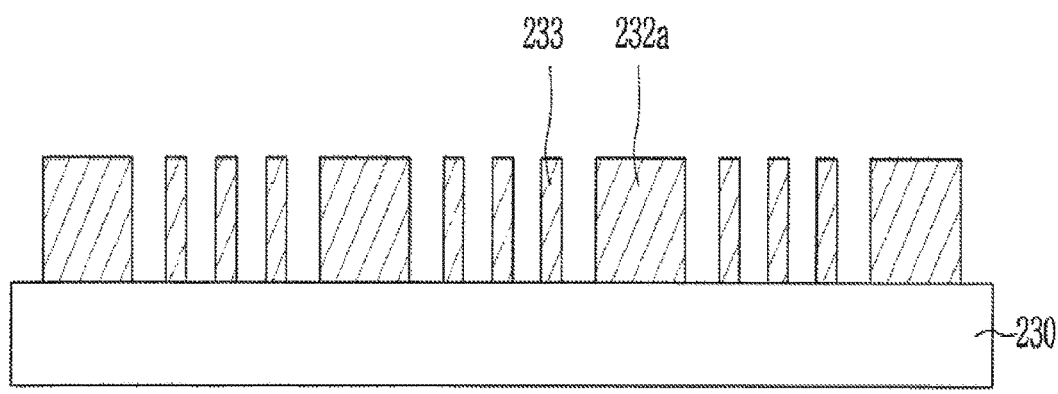

Subsequently, as illustrated in FIG. 5F, after irradiating the black matrix 232a and the dummy black matrix 232b with light using the second photo mask 250 as a mask, a portion of the dummy black matrix 232b, which is not irradiated with light, is removed through exposure and developing processes, whereby a plurality of light control partitions 233 is formed. At this time, the light control partitions 233 are formed in each of the pixel areas. In addition, one or more light control partitions 133 may be formed according to resolution or a viewing angle.

In addition, the light control partition 233 may have the same thickness as the black matrix 232a. However, the light control partition 233 is not limited to the same thickness as the black matrix 232a, and may be formed to have a thickness greater than that of the black matrix 232a.

The light control partition 233 may have the same thickness as the black matrix 232a. However, the light control partition 233 is not limited to the same thickness as the black matrix 232a, and may have a thickness greater or smaller than the thickness of the black matrix 232a.

Figure 5G:
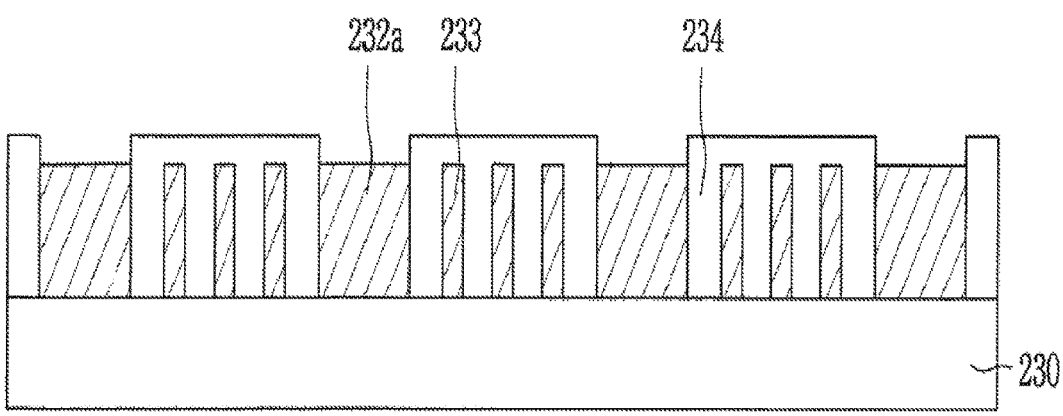

Subsequently, as illustrated in FIG. 5G, red, green and blue color filters 234 are formed in the pixel areas of the upper substrate 230. At this time, in the pixel areas of the upper substrate 230, in addition to the red, green and blue color filters 234, the light control partitions 233 are located.

Figure 5H:
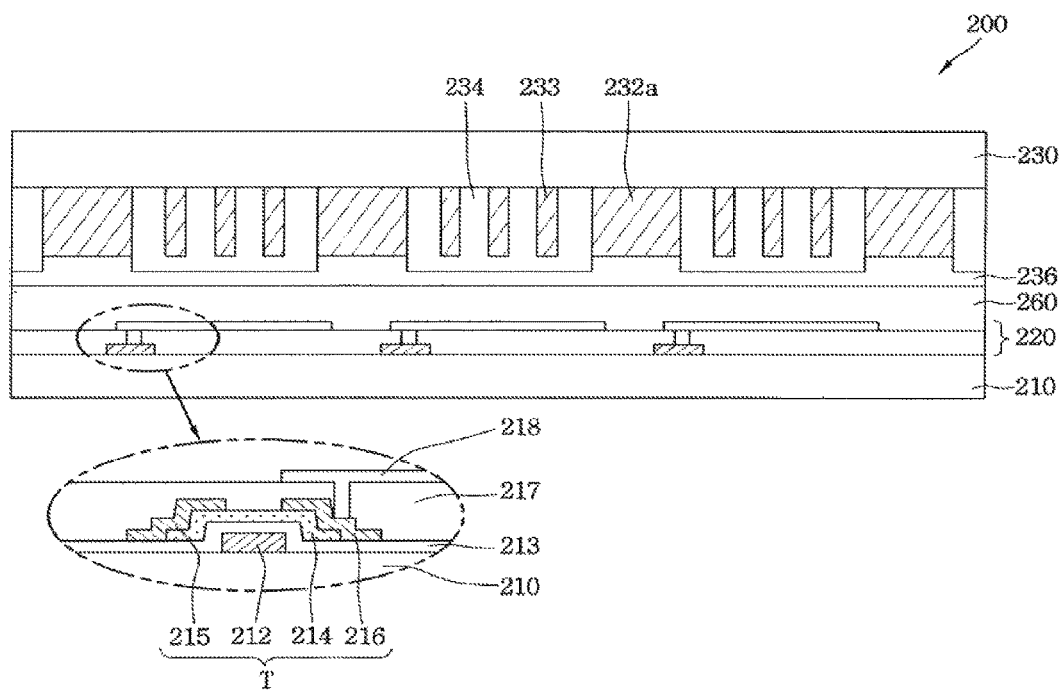

Subsequently, as illustrated in FIG. 5H, an overcoat layer 236 is formed over the entire surface of the upper substrate 230 on which the color filters 234 and the light control partitions 233 have been formed.

Subsequently, an upper alignment layer is formed over the entire surface of the overcoat layer 236.

Subsequently, after the upper substrate 230 and the lower substrate 210 are disposed so as to face each other with a constant distance therebetween, a liquid crystal layer 260 is formed between the substrates 210 and 230.

Subsequently, when an upper polarizer plate and a lower polarizer plate are formed on the rear surfaces of the upper substrate 230 and the lower substrate 210, the process of manufacturing the display panel 200 is completed.

In this way, through the method of manufacturing the display panel according to the other embodiment of the present invention, although two separate masks are used and thus the number of masking processes is increased, the plurality of light control partitions may be formed with a higher resolution, which enables more precise pattern formation and may realize an excellent narrow viewing angle mode.

Figure 6:
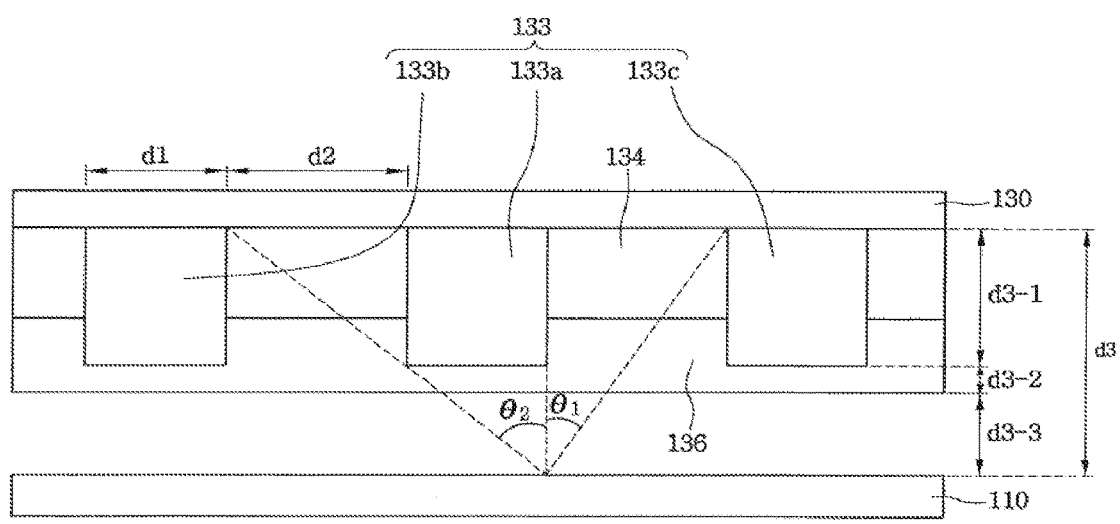
FIG. 6 is a view for explaining a viewing angle of the display panel according to an embodiment of the present invention.

FIG. 6 is a view for explaining a viewing angle of the display panel according to an embodiment of the present invention.

In particular, FIG. 6 is a view for explaining a viewing angle that results when three light control partitions 133a, 133b and 133c are formed in each pixel area.

As illustrated in FIG. 6, the light control partitions 133 include a first light control partition 133a located at the center, and a second light control partition 133b and a third light control partition 133c, which are spaced apart leftward and rightward from the first light control partition 133a by a constant distance.

Here, on the basis of a center point on the upper surface of the lower substrate 110, a viewing angle between one side surface of the first light control partition 133a and the lower end of one side surface of the third light control partition 133c, i.e., the point at which the third light control partition 133c, which is located at the right side of the first light control partition 133a, comes into contact with the upper substrate 130 is designated by tan θ1. Here, θ1 indicates the maximum viewing angle.

In addition, on the basis of a center point on the upper surface of the lower substrate 110, a viewing angle between one side surface of the first light control partition 133a and the lower end of one side surface of the second light control partition 133b, i.e., the point at which the second light control partition 133b, which is located at the left side of the first light control partition 133a, comes into contact with the upper substrate 130 is designated by tan θ2.

In addition, the width of the first, second and third light control partitions 133a, 133b and 133c, i.e., a first distance, is designated by d1, and a second distance between the first, second and third light control partitions 133a, 133b and 133c is designated by d2. In addition, a third distance between the upper substrate 130 and the lower substrate 110 is designated by d3. Here, the third distance d3 is defined as the distance including the height of the partitions d3-1, the thickness of the overcoat layer d3-2 excluding the height difference between the partition 133 and the color filter 134, and a cell gap d3-3.

For example, assuming that the first distance d1 is about 8 μm, the second distance d2 is 8 μm, and the third distance d3 is 9 μm, the viewing angle becomes about 42 degrees because tan θ1=8/9=0.889, and the viewing angle becomes about 60 degrees because tan θ2=16/9=1.778.

In addition, the distance d2 between the light control partitions may be smaller than the cell gap d3-3, and the width d1 of the light control partitions may be smaller than the cell gap d3-3. In addition, the width of the light control partitions may be smaller than the width of the black matrix 132a.

Accordingly, the viewing angle of the structure described above becomes 42 degrees because light is not transmitted at viewing angles of 42 degrees or more. Here, when θ2 exceeds θ1, for example, 42 degrees and reaches 60 degrees, the light passes through the corner of the top of the first light control partition 133a and the bottom of the pixel area, i.e., the corner of the bottom of the second light control partition 133b. No light leaks before and after the light passes through the top and bottom of the light control partitions. Hence, the viewing angle θ1 in the partition structure becomes 42 degrees.

In particular, when it is desired to reduce a viewing angle, this may be realized by reducing the second distance d2. That is, in order to reduce the viewing angle to about ±30 degrees or less, the second distance d2 of the light control partitions 133 may be about 5 μm.

In addition, when it is desired to increase a viewing angle, the first distance d1 may be reduced, or the height of the partition d3-1 may be reduced.

In this way, the present invention may control the characteristics of the viewing angle by selectively adjusting the first distance d1, the second distance d2 and the third distance d3.

As is apparent from the above description, in a display panel according to the present invention, a plurality of light control partitions may be formed in each pixel area simultaneously with the formation of a black matrix, which enables the omission of an existing light control film. Thereby, a narrow viewing angle may be realized without increasing the thickness or manufacturing cost of a product.

It will be understood by those skilled in the art that the present invention may be implemented into various other concrete forms without changing the technical idea or essential features of the present invention.

Accordingly, the disclosed embodiments are provided for the purpose of description and are not intended to limit the technical scope of the disclosure, and the technical scope of the disclosure is not limited by the embodiments. The range of the disclosure should be interpreted based on the following claims, and all technical ideas that fall within the range equivalent to the claims should be understood as belonging to the scope of the disclosure.

What is claimed is:

1. A display panel comprising:
   a lower substrate having a thin-film transistor array;
   an upper substrate disposed so as to face the lower substrate;
   a black matrix provided on the upper substrate and configured to delimit each pixel area;
   more than two light control partitions provided in the pixel area of the upper substrate;
   a color filter provided in the pixel area of the upper substrate;
   an overcoat layer provided over an entire surface of the upper substrate on which the color filter and the more than two light control partitions have been provided; and
   a liquid crystal layer provided between the upper substrate and the lower substrate,
   wherein the more than two light control partitions are embedded in the color filter.

2. The display panel according to claim 1, wherein the more than two light control partitions are formed of a same material as the black matrix.

3. The display panel according to claim 1, wherein the more than two light control partitions are formed of a material different from a material of the black matrix.

4. The display panel according to claim 1, wherein each of the more than two light control partitions has a same thickness as the black matrix.

5. The display panel according to claim 1, wherein each of the more than two light control partitions has a thickness different from a thickness of the black matrix.

6. The display panel according to claim 5, wherein the thickness of each of the more than two light control partitions is greater than the thickness of the black matrix.

7. The display panel according to claim 1, wherein each of the more than two light control partitions has a width smaller than a width of the black matrix.

8. The display panel according to claim 1, wherein a distance between the more than two light control partitions is smaller than a cell gap.

9. The display panel according to claim 1, wherein each of the more than two light control partitions has a width smaller than a cell gap.

10. The display panel according to claim 1, wherein the more than two light control partitions are provided in the color filter of the pixel area.

11. The display panel according to claim 1, wherein a height of each of the more than two light control partitions is greater than a height of the color filter.

12. The display panel according to claim 1, wherein a height of each of the more than two light control partitions is smaller than a height of the color filter.

13. The display panel according to claim 1, wherein a height of each of the more than two light control partitions is greater than a height of the black matrix.

14. The display panel according to claim 1, wherein a height of each of the more than two light control partitions is equal to a height of the black matrix.

15. The display panel according to claim 1, wherein each of the more than two light control partitions has a rectangular, trapezoidal, triangular or any other cross-sectional shape.

16. The display panel according to claim 1, wherein both side ends of each of the more than two light control partitions are connected to the black matrix.

* * * * *